(12) United States Patent
Holur et al.

(10) Patent No.: US 7,623,505 B1
(45) Date of Patent: *Nov. 24, 2009

(54) METHOD AND SYSTEM FOR LABEL EDGE ROUTING IN A WIRELESS NETWORK

(75) Inventors: Balaji S. Holur, Plano, TX (US); Warren T. King, Allen, TX (US); Charles J. Derrick, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 507 days.

This patent is subject to a terminal disclaimer.

(21) Appl. No.: 11/271,254

(22) Filed: Nov. 10, 2005

Related U.S. Application Data (63) Continuation of application No. 09/771,205, filed on Jan. 26, 2001, now Pat. No. 6,990,086.

(51) Int. Cl.
*H04J 3/24* (2006.01)

(52) U.S. Cl. ............... 370/349; 370/328; 370/392; 370/469

(58) Field of Classification Search .......... 370/349, 370/389, 336, 340, 395.2, 395.21, 469, 328, 370/338, 356, 392, 329, 406; 455/406, 407, 455/408, 445, 426, 403, 442, 561, 412
See application file for complete search history.

(56) References Cited

U.S. PATENT DOCUMENTS

| | | | |
|---|---|---|---|
| 5,535,210 A * | 7/1996 | Smolinske et al. | 370/461 |
| 5,568,478 A | 10/1996 | van Loo et al. | 370/392 |
| 5,586,121 A | 12/1996 | Moura et al. | 370/404 |
| 5,610,910 A | 3/1997 | Focsaneanu et al. | 370/351 |
| 5,784,442 A * | 7/1998 | Foti | 455/405 |
| 5,818,845 A | 10/1998 | Moura et al. | 370/449 |
| 5,828,666 A | 10/1998 | Focsaneanu et al. | 370/389 |
| 5,991,292 A | 11/1999 | Focsaneanu et al. | 370/352 |
| 6,005,580 A | 12/1999 | Donovan | 345/428 |
| 6,075,792 A | 6/2000 | Ozluturk | 370/441 |
| 6,115,370 A | 9/2000 | Struhsaker et al. | 370/342 |
| 6,327,254 B1 | 12/2001 | Chuah | 370/328 |
| 6,408,001 B1 | 6/2002 | Chuah et al. | 370/392 |
| 6,452,942 B1 | 9/2002 | Lemieux | 370/468 |
| 6,480,712 B1 | 11/2002 | Vigil | 455/412.2 |

(Continued)

FOREIGN PATENT DOCUMENTS

WO    WO 9844639 A2 * 10/1998

OTHER PUBLICATIONS

Holur, et al., U.S. Appl. No. 10/004,320, filed Oct. 30, 2001, *Method and System for Managing Pushed Data at a Mobile Unit*, 50 pages of Specification, Claims and Abstract and 6 pages of drawings.

(Continued)

*Primary Examiner*—Ian N Moore
(74) *Attorney, Agent, or Firm*—Baker Botts L.L.P.

(57) ABSTRACT

A method for label edge routing in a wireless network is provided. The method includes providing a flow between an application of a mobile unit and a serving node. The flow includes an outbound flow from the application. The outbound flow is received at the mobile unit. The flow is classified at the mobile unit.

24 Claims, 5 Drawing Sheets

U.S. PATENT DOCUMENTS

| | | |
|---|---|---|
| 6,501,741 B1 | 12/2002 | Mikkonen et al. ............ 370/310 |
| 6,564,059 B1 | 5/2003 | Cyr et al. ..................... 455/445 |
| 6,587,457 B1 | 7/2003 | Mikkonen .................... 370/356 |
| 6,608,832 B2 | 8/2003 | Forslow ....................... 370/353 |
| 6,621,793 B2 | 9/2003 | Widegren et al. ......... 370/230.1 |
| 6,665,537 B1 | 12/2003 | Lioy ........................... 455/435 |
| 6,680,943 B1 | 1/2004 | Gibson et al. ............... 370/392 |
| 6,690,679 B1 | 2/2004 | Turunen et al. ............. 370/469 |
| 6,711,141 B1 | 3/2004 | Rinne et al. ................. 370/328 |
| 6,721,269 B2 | 4/2004 | Cao et al. .................... 370/227 |
| 6,731,617 B1 | 5/2004 | Mizell et al. ................ 370/328 |
| 6,731,639 B1 | 5/2004 | Ors et al. ................ 370/395.51 |
| 6,778,496 B1 | 8/2004 | Meempat et al. ............ 370/230 |
| 6,957,071 B1 | 10/2005 | Holur et al. ............. 455/452.2 |
| 2001/0027490 A1 | 10/2001 | Fodor et al. ................. 709/238 |
| 2002/0064164 A1 | 5/2002 | Barany et al. ............... 370/401 |
| 2002/0067704 A1 | 6/2002 | Ton ............................. 370/329 |
| 2002/0105922 A1 | 8/2002 | Jabbari et al. ............... 370/328 |
| 2002/0122432 A1 | 9/2002 | Chaskar ...................... 370/466 |
| 2004/0032844 A1 | 2/2004 | Lewis et al. ................. 370/338 |

OTHER PUBLICATIONS

Holur, et al., U.S. Appl. No. 09/771,257, filed Jan. 26, 2001, *Method and System for Providing Service Trigger Management in a Wireless Network*. 45 pages of Specification, Claims and Abstract and 6 pages of drawings.

TR45, cdma2000 Wireless IP Network Standard, TIA/EIA/IS-835-B, 1-page cover, 8 pages Table of Contents, Figures, Tables and Revision History, and 98 pages of text.

Mobile Wireless Internet Forum (mwif), "*Network Reference Architecture Technical Report MTR-004*", Release 2.0, Contribution Reference No. MWIF 2001.053.3, 95 pages, Jun. 13, 2003.

Mobile Wireless Internet Forum (mwif), *OpenRAN Architecture in 3rd Generation Mobile Systems*, Technical Report MTR-007, Release v1.0.0, 64 pages, Sep. 4, 2001.

3GPP TS 22.101 6.4.0, *3rd Generation Partnership Project; Technical Specification Group Services and System Aspects Service aspects; Service principles*, Release 6, 45 pages, Jun. 2003.

Xerox PARC, RFC 1256, "*ICMP Router Discovery Messages*", 18 pages, Sep. 1991.

Wu, et al, RFC 3270, "*Multi-Protocol Label Switching (MPLS) Support of Differentiated Services*", 57 pages, May 2002.

IBM, RFC 2002, "*IP Mobility Support*", 71 pages, Oct. 1996.

std005, RFC 791, "Internet Protocol", DARPA Internet Program Protocol Specification, 115 pages, Sep. 1981.

J. Boyle, et al, IPHighway, RFC 2749, "*COPS Usage for RSVP*", 16 pages, Jan. 2000.

S. Herzog, IPHighway, RFC 2750, "*RSVP Extensions for Policy Control*", 13 pages, Jan. 2000.

Xerox PARC, RFC 2236, "*Internet Group Management Protocol, Version 2*", 23 pages, Nov. 1997.

J. Boyle, et al, "*The COPS (Common Open Policy Service) Protocol*", RFC 2748, 36 pages, Jan. 2000.

3GPP Specifications—Numbering Scheme, http://www.3gpp.org/specs/numbering.htm, 2 pages, May 7, 2003.

\* cited by examiner

METHOD AND SYSTEM FOR LABEL EDGE ROUTING IN A WIRELESS NETWORK

CROSS-REFERENCE TO RELATED APPLICATION

This application is a continuation of U.S. application Ser. No. 09/771,205 filed Jan. 26, 2001 and entitled "Method and System for Label Edge Routing in a Wireless Network," now issued as U.S. Pat. No. 6,990,086.

TECHNICAL FIELD OF THE INVENTION

This invention relates generally to the field of wireless communications and more particularly to a method and system for label edge routing in a wireless network.

BACKGROUND OF THE INVENTION

The communications industry is a rapidly growing industry that affects almost every other major industry. Because of the field's rapid growth, the management of communication systems, including routing traffic within the systems, has become more difficult as the systems have become increasingly larger and more complex. Many modern communication systems, therefore, include the ability to provide label-switched routing in order to forward IP packets based on Layer 2 information, as opposed to conventional Layer 3-based routing.

Label-switched routing provides numerous advantages which include higher performance and lower cost due to simplified forwarding, separation of typically complex flow classification from forwarding which results in the ability to process increasingly complex flow classification, and low-overhead source routing. Label-switched routing also facilitates traffic engineering by mapping label-switched paths to traffic-engineered routes and facilitates Quality of Service (QoS) by mapping label-switched paths to different per-hop behaviors.

Conventional wireless networks provide label edge routing functionality at the edge through a packet data serving node. The serving node stores information for the wireless device when a session for the wireless device is created. The serving node then performs a label exchange with an adjacent network node in order to establish a label-switched path for forwarding the session's traffic to and from the network.

Thus, in a conventional wireless network, when the serving node receives a packet from a wireless device, the serving node examines the Layer 3 contents of the packet and performs a look-up of the stored information for that wireless device. The serving node then classifies the flow, determines the type of processing to apply to the packet, and obtains labels to insert into the packet based on the results of looking up the stored information. Similarly, when the serving node receives network traffic destined for the wireless device via the label-switched path, the serving node is responsible for removing the label, reconstructing the packet and forwarding the packet to the wireless device.

Therefore, in providing label-switched routing in this manner, the resources of the serving node are heavily utilized for every packet that is received at the serving node. In addition, the granularity of flow classification is limited by the amount of information that may be stored in the serving node for the wireless devices in the network. Generally, this stored information relates only to an aggregation of traffic to and from the wireless devices but does not include any information about the number or types of flows that may be terminated beyond the wireless device.

SUMMARY OF THE INVENTION

In accordance with the present invention, a method and system for label edge routing in a wireless network are provided that substantially eliminate or reduce disadvantages and problems associated with previously developed systems and methods. In particular, the functionality of a label edge router is distributed between a wireless device and a serving node to more efficiently route traffic in a wireless network.

In one embodiment of the present invention, a method for label edge routing in a wireless network is provided. The method includes providing a flow between an application of a mobile unit and a serving node. The flow includes an outbound flow from the application. The outbound flow is received at the mobile unit. The flow is classified at the mobile unit.

In another embodiment of the present invention, a method for label edge routing in a wireless network is provided that includes receiving at the serving node an outbound flow from a mobile unit. The outbound flow includes a plurality of outbound packets. Each of the outbound packets includes an outbound label stack comprising at least one label. The outbound label stack is added to the outbound packets by the mobile unit. The outbound packets are forwarded to the network based on the outbound label stacks.

Technical advantages of the present invention include providing an improved method for label edge routing in a wireless network. The label-switched routing may be implemented using multi-protocol label switching (MPLS) or other suitable label switching technology, In a particular embodiment, the wireless device sends information about the flow characteristics of a flow to the serving node when the flow is created. The serving node updates its stored information, assigns labels to the flow, and sends the labels to the wireless device. As a result, the wireless device may perform a content-based flow classification and apply flow-specific labels to a packet that is to be sent to the serving node. Accordingly, the serving node is relieved of the burden of performing these tasks for each packet from the wireless device distributing intelligence.

Other technical advantages of particular embodiments the present invention include the enablement of local configuration of classification parameters and policies at a wireless device, the providing of different Quality of Service (QoS) levels to multiple traffic flows through a wireless device, and the enablement of real-time set-up of flow characteristics by the wireless device.

Another technical advantage of the present invention includes distributing intelligence for label-switched routing across the wireless infrastructure and the wireless devices. This reduces processing power required by the wireless infrastructure, which reduces costs for the operator.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
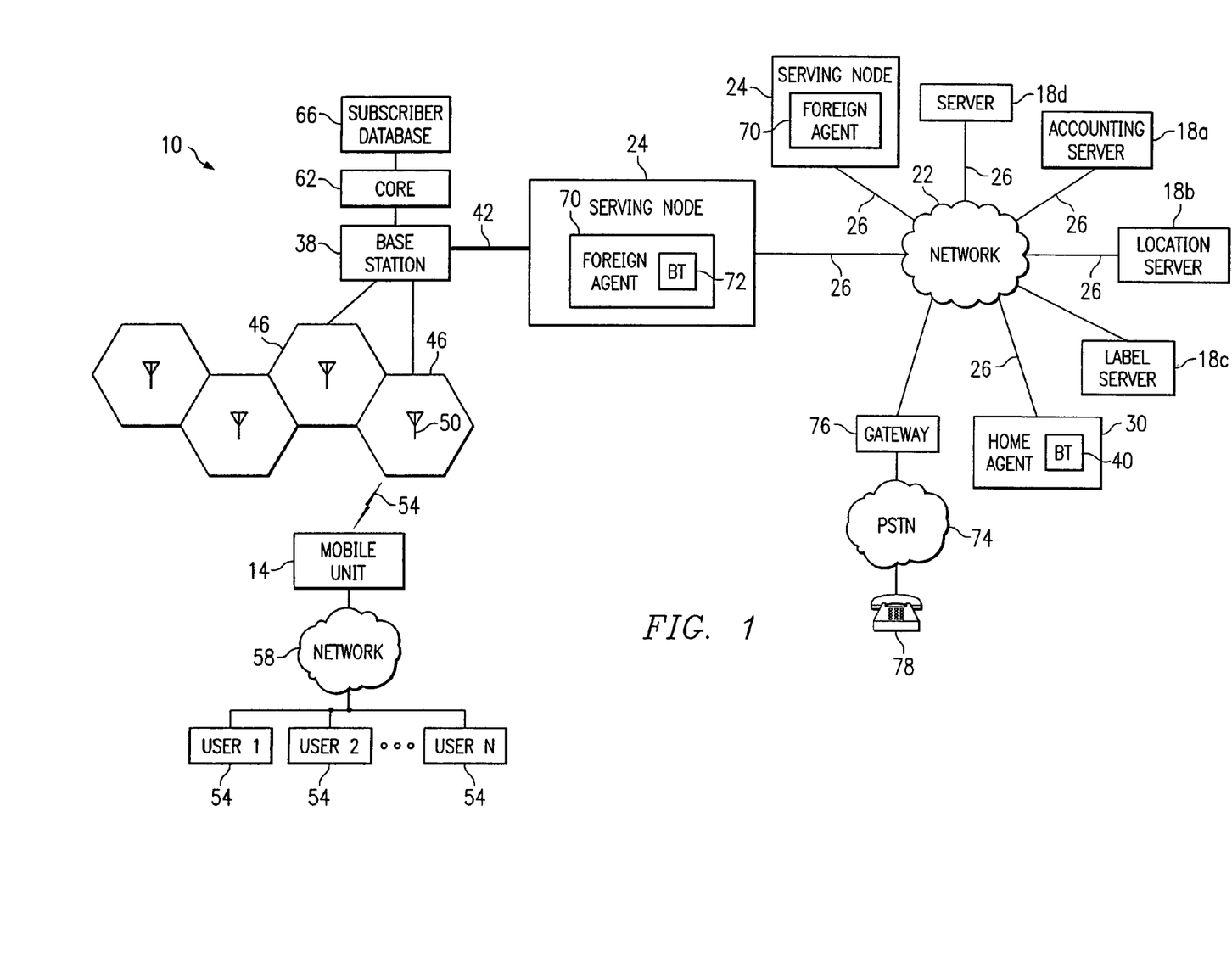
FIG. 1 is a block diagram illustrating a communications system in accordance with one embodiment of the present invention.

FIG. 1 is a block diagram illustrating a wireless communications system 10 in accordance with one embodiment of the present invention. The system 10 may transmit voice, audio, video and/or other types of data from one point to another. The system 10 comprises a plurality of mobile units 14 and a plurality of servers 18.

The mobile unit 14 may comprise a wireless telephone, a wireless interface terminal, or other suitable mobile device operable to provide wireless communication in the system 10. The servers 18 may comprise an accounting server 18a, a location server 18b, a label server 18c, or any other suitable server 18d for providing services in the system 10.

The mobile units 14 and the servers 18 are coupled to one another and communicate through a network 22, in addition to a wireless infrastructure and serving nodes 24. The network 22 may provide this communication over a plurality of communication links 26. The network 22 may be any interconnection found on any computer network such as a wide area network, the Internet, or any other communications and data exchange systems created by connecting two or more computers.

The communication links 26 may be any type of communication link capable of supporting data transfer. In one embodiment, the communication links 26 may comprise, alone or in combination, Integrated Services Digital Network, Asymmetric Digital Subscriber Line, T1 or T3 communication lines, hard-wire lines, telephone lines or wireless communication. It will be understood that the communication links 26 may comprise other suitable types of data communication links. The communication links 26 may also connect to a plurality of intermediate servers between the network 22 and the mobile units 14 and the servers 18.

The system 10 also comprises at least one home agent 30 for each mobile unit 14, a plurality of packet data serving nodes 24, and a plurality of base stations 38. The home agent 30 comprises a binding table 40 that is operable to store data relating to the mobile unit 14, as described in more detail below. Each serving node 24 is coupled to a base station 38 through a plurality of radio packet (RP) data switch node links 42 or other suitable links. Each RP link 42 provides a logical path for a mobile unit packet session between the base station 38 and the serving node 24. Each base station 38 is operable to provide communication for mobile units 14 within any of a plurality of cells 46 for that base station 38. As used herein, "each" means every one of at least a subset of the identified items. The mobile unit 14 is operable to communicate with the base station 38 through a transceiver 50 in the cell 46 over a radio frequency (RF) link 54 or other suitable wireless link.

According to one embodiment, the link 54 is an RF link that may be based on established technologies or standards, such as IS-54 (TDMA), IS-95 (CDMA), GSM and AMPS, 802.11 based WLAN, or more recent technology, such as CDMA 2000 and W-CDMA or proprietary radio interfaces. In a particular embodiment, the link 54 comprises a code division multiple access (CDMA) link based on a CDMA standard and in which packets are segmented into frames for wireless transmission from the mobile unit 14 to the base station 38 where the frames are re-assembled to reconstitute the packets.

According to the embodiment illustrated in FIG. 1, the mobile unit 14 comprises a wireless interface terminal that is operable to host a plurality of users 54. The mobile unit 14 and the users 54 are coupled to one another and communicate through a network 58. The network 58 may be any interconnection found on any computer network such as a local area network, a wide area network, the Internet, or any other communications and data exchange systems created by connecting two or more computers.

The system 10 also comprises a core 62 that is coupled to the base station 38 and a subscriber database 66 that is coupled to the core 62. The core 62 is operable to perform authentication and to set up and disconnect calls for mobile units 14 in cells 46 for the corresponding base station 38. The core 62 is also operable to store service level agreements for each user 54 and to provide the agreements to the serving node 24 for service trigger management. The core 62 may comprise a mobile switching center that is operable to provide, in conjunction with the base station 38, switch and soft hand-off functionality for the system 10. In this way, voice, video, data and other information is routed to and from the mobile units 14 and connections are maintained with the mobile units 14 as they move throughout the system 10. The subscriber database 66 is operable to store information relating to mobile units 14 and/or users 54, such as name, address, account number, account type, and any other suitable information.

Each serving node 24 comprises a foreign agent 70 that is operable to provide communication between a mobile unit 14 and an endpoint through the network 22. The endpoint may comprise another mobile unit 14, a standard telephone, a server 18, or other suitable device. The foreign agent 70 provides functionality similar to the home agent 30 when the mobile unit 14 is out of range for communicating with the home agent 30. The foreign agent 70 comprises a binding table 72 that is operable to store data relating to the mobile unit 14.

According to one embodiment, for each mobile unit 14 corresponding to the home agent 30, the binding table 40 comprises a mobile unit identifier, a care of address (COA) for the current foreign agent 70, the internet protocol (IP) address or addresses assigned to the mobile unit 14, and any other suitable tunneling characteristics. Similarly, for each mobile unit 14 corresponding to the foreign agent 70, the binding table 72 comprises a mobile unit identifier, an address for the home agent 30, the IP address or addresses assigned to the mobile unit 14, and any other suitable tunneling characteristics.

The mobile unit 14 and the serving node 24 may communicate data and associated addressing information in-band and may also communicate with each other through out-of-band messaging. As used herein, "out-of-band" means communication of data that may be retrieved without inspecting the contents of the payload data of in-band messages. Thus, out-of-band communication provides a mechanism for communicating data in order to implement functions which may be undefined at the time the in-band messaging parameters are determined.

As described in more detail below in connection with FIGS. 2A-C, agent discovery messages, such as agent advertisement messages and agent solicitation messages, allow out-of-band communication that enables the mobile unit 14 to determine whether the mobile unit 14 is in communication with its home agent 30 or a foreign agent 70, to determine whether the mobile unit 14 has roamed from one foreign agent 70 to another foreign agent 70, to obtain a COA when in communication with a foreign agent 70, to assist the serving node 24 with service trigger management, or to obtain any other suitable information.

In addition to being operable to provide communication for mobile units 14 comprising the ability to communicate out-of-band messages, the serving node 24 is also operable to provide communication for standard mobile units that are incapable of communicating with out-of-band messages. Thus, for example, while establishing a connection for either a standard mobile unit or a mobile unit 14, the serving node 24 may identify the connection as out-of-band incapable or as out-of-band capable. In this way, the system 10 may support network communication for either type of mobile unit.

The network 22 connects a number of servers 18 to each other and to the serving node 24. The network 22 also connects the serving node 24, and thus the mobile unit 14, to the public switched telephone network (PSTN) 74 through a gateway 76. Accordingly, the mobile unit 14 may communicate through a serving node 24, the network 22 and the PSTN 74 with standard telephones, clients and computers using modems or digital subscriber line (DSL) connections or other telephony devices 78.

In operation, when a mobile unit 14 is outside the range of its home agent 30 such that communication with the network 22 is provided by a foreign agent 70, the serving node 24 recognizes that the mobile unit 14 is communicating with a transceiver 50 in a cell 46 for the base station 38 corresponding to the serving node 24. Based on this recognition, the foreign agent 70 for the serving node 24 transmits an agent advertisement message (AAM) on the RP link 42 for the mobile unit 14. In this way, only the mobile unit 14 associated with the RP link 42 receives the AAM. The AAM comprises a header, router advertisement information, a mobile advertisement extension and other extensions, as shown in FIG. 2B. The foreign agent 70 generates the AAM as a broadcast or multicast message, or other suitable type of message which may be processed by the mobile unit 14 before an IP address is assigned to the mobile unit 14, with a source address of the foreign agent 70. The foreign agent 70 provides the COA by setting the COA field in an agent advertisement extension of the AAM.

After receiving the AAM from the foreign agent 70, the mobile unit 14 transmits a registration request message (RReqM) to the foreign agent 70 as a home link directed broadcast message. The RReqM comprises a user identifier, a mobile identifier, a telephone number, or other suitable information from which a home agent 30 may identify the mobile unit 14.

The foreign agent 70 transmits the RReqM throughout the network 22 to identify home agents 30 for the mobile unit 14. Any home agent 30 in the home network for the mobile unit 14 that receives the RReqM from the foreign agent 70 may respond by transmitting a registration reply message (RRepM). The RRepM comprises a home agent address and a code field value indicating a rejection of the request. The foreign agent 70 receives an RRepM from each home agent 30, stores relevant information regarding the home agents 30 in the binding table 72, and transmits these messages to the mobile unit 14 over the RP link 42 for the mobile unit 14.

The mobile unit 14 selects one home agent 30 and transmits an RReqM to the foreign agent 70 that indicates which home agent 30 has been selected. The foreign agent 70 updates the binding table 72 and transmits the RReqM to the selected home agent 30 which assigns an IP address for the mobile unit 14. The foreign agent 70 also notifies the selected home agent 30 of the COA of the foreign agent 70 for forwarding packets to the mobile unit 14.

The selected home agent 30 transmits an RRepM comprising the IP address for the mobile unit 14 to the foreign agent 70. The foreign agent 70 transmits the RRepM to the mobile unit 14 over the RP link 42. The mobile unit 14 retrieves the IP address from the RRepM as its address for communication. At this point, the mobile unit 14 may send messages with the retrieved IP address as a source address and may process messages with the retrieved IP address as a destination address.

The selected home agent 30 notifies the network 22 with a broadcast message that any messages with the IP address of the mobile unit 14 as a destination address are to include a media access control (MAC) address for the home agent 30. The network routers update their routing tables to include the MAC address of the home agent 30 for the IP address of the mobile unit 14. Each message for the mobile unit 14 will then comprise the MAC address of the home agent 30 and the destination IP address of the mobile unit 14. The home agent 30 intercepts each packet destined for the mobile unit 14. Based on the COA of the foreign agent 70, the home agent 30 tunnels the intercepted packets to the foreign agent 70. The foreign agent 70 extracts the original packets and delivers them to the mobile unit 14.

If the mobile unit 14 moves to a cell 46 for a different base station 38 corresponding to a different serving node 24 and foreign agent 70, the home agent 30 updates the COA in the binding table 40 to correspond to the new foreign agent 70. In this way, messages for the mobile unit 14 will be tunneled to the appropriate foreign agent 70 which may then transmit the messages to the mobile unit 14. According to one embodiment, the mobile unit 14 sends an RReqM to the current foreign agent 70 which relays the message to the home agent 30. The home agent 30 updates entries in the binding table 40 with the new COA and sends an RRepM to the mobile unit 14 through the current foreign agent 70. The previous foreign agent 70 removes the information from the binding table 72 after the expiration of a timer.

Figures 2A, 2B:
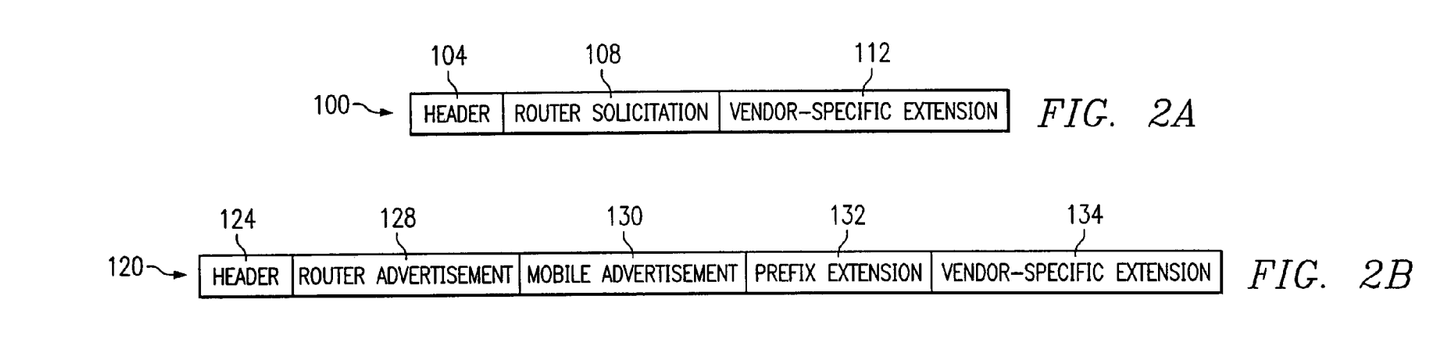
FIG. 2A is a block diagram illustrating a message structure for an Agent Solicitation Message (ASM) for providing out-of-band communication within the system of FIG. 1 in accordance with one embodiment of the present invention.
FIG. 2B is a block diagram illustrating a message structure for an Agent Advertisement Message (AAM) for providing out-of-band communication within the system of FIG. 1 in accordance with one embodiment of the present invention.

FIG. 2A is a block diagram illustrating a message structure for an Agent Solicitation Message (ASM) 100 for providing out-of-band communication within the system 10 in accordance with one embodiment of the present invention. The ASM 100 comprises a header 104, a router solicitation field 108, and a vendor-specific extension 112. In accordance with one embodiment, the ASM 100 comprises an Internet Control Message Protocol (ICMP) router solicitation message with extensions. The ASM 100 is transmitted from a mobile unit 14 to a foreign agent 70 in order to set up sessions, to hand-off between serving nodes 24, to assist in label-switched routing, or to perform any other suitable task. The vendor-specific extension 112 provides the out-of-band communication in that the foreign agent 70 receives and processes the information in the vendor-specific extension 112 without having to process payload data in in-band messages.

FIG. 2B is a block diagram illustrating a message structure for an Agent Advertisement Message (AAM) 120 for providing out-of-band communication within the system 10 in accordance with one embodiment of the present invention. The AAM 120 comprises a header 124, a router advertisement field 128, a mobile advertisement field 130, a prefix length extension 132, and a vendor-specific extension 134. In accordance with one embodiment, the AAM 120 comprises an ICMP router advertisement message with extensions. The AAM 120 is transmitted from the foreign agent 70 to the mobile unit 14 in order to set up sessions, to hand-off between serving nodes 24, to assist in label-switched routing, or to perform any other suitable task. The vendor-specific extension 134 provides the out-of-band communication in that the mobile unit 14 receives and processes the information in the vendor-specific extension 134 without having to process payload data in in-band messages.

Figure 2C:
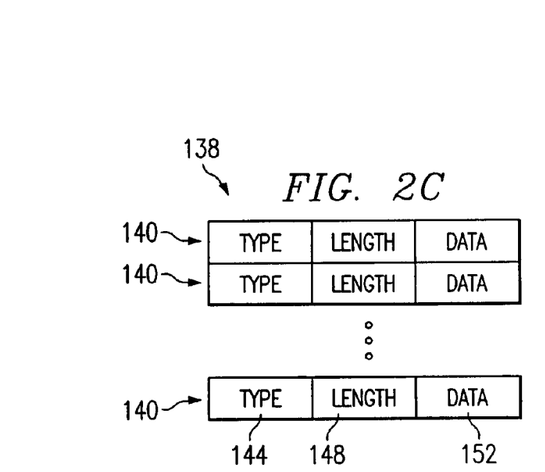
FIG. 2C is a block diagram illustrating a message structure for the Vendor-Specific Extensions of the ASM and the AAM of FIGS. 2A-B in accordance with one embodiment of the present invention.

FIG. 2C is a block diagram illustrating a message structure for a vendor-specific extension 138 in accordance with one embodiment of the present invention. The vendor-specific extension 138 may comprise the vendor-specific extension 112 of the ASM 100 and/or the vendor-specific extension 134 of the AAM 120. The vendor-specific extension 138 comprises one or more data extensions 140.

Each data extension 140 comprises a data type 144 indicating what type of data is included in the data extension 140, a data length 148 indicating the length of the data included in the data extension 140, and a data field 152 that comprises the actual data for the data extension 140. The data type 144 may comprise "application identifier," "user data," or any other suitable data type known to both a service provider for the network 22 and the mobile vendors. The data length 148 may comprise the length of the data field 152 in bytes. The format and length of the data field 152 are determined by the data type 144 and data length 148. Data extensions 140 allow variable amounts of information to be included within each discovery message.

Figure 3:
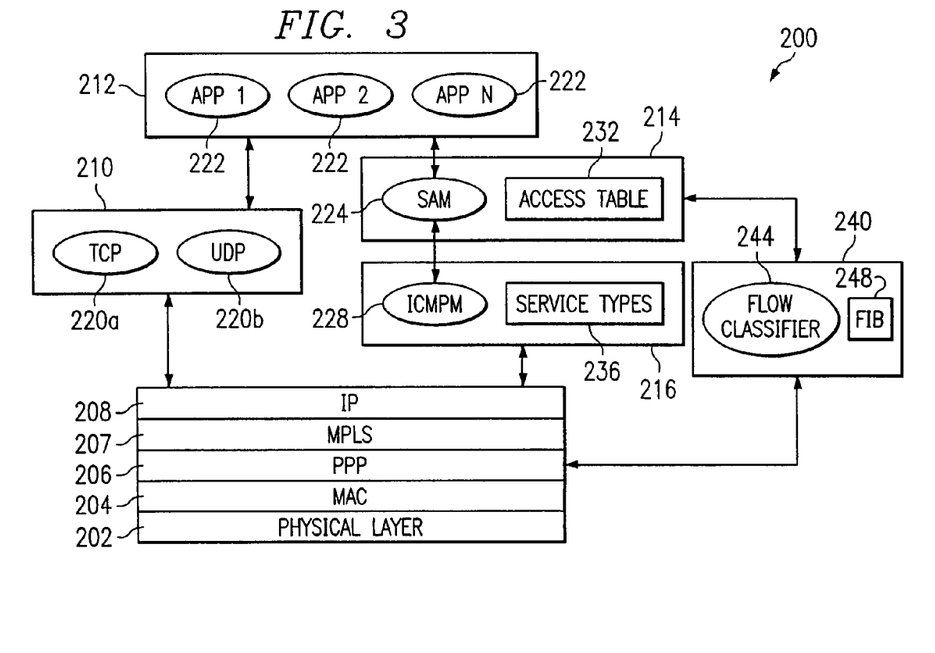
FIG. 3 is a block diagram illustrating a protocol stack for communication over the wireless link of the system of FIG. 1 in accordance with one embodiment of the present invention.

FIG. 3 is a block diagram illustrating a protocol stack 200 for communication over the wireless link 54 in accordance with one embodiment of the present invention. The protocol stack 200 is operable to authenticate mobile units 14 and establish radio frequency links to serving nodes 24. The protocol stack 200 comprises a physical layer 202, a MAC layer 204, a point-to-point protocol (PPP) layer 206, an MPLS layer 207 and an IP layer 208. The MPLS layer 207 is operable to manage a label-switched path between the serving node 24 and the mobile unit 14.

The protocol stack 200 also comprises a transport layer 210, an application layer 212, an access layer 214, and an ICMP layer 216. The transport layer 210 is operable to process in-band communications. The application layer 212 comprises one or more applications 222, each of which may be executed in the mobile unit 14 either alone or concurrently with other applications 222. The applications 222 may comprise telephony, video, voice, web browser, or any other suitable applications. The transport layer 210 comprises one or more protocols 220 for the applications 222. For example, the transport layer 210 may comprise a transmission control protocol 220a for packet data applications 222, a user datagram protocol 220b for mobile IP applications 222, or any other suitable protocol 220.

The access layer 214 comprises a service access manager 224 that is operable to manage out-of-band communication for a plurality of applications 222 in the mobile unit 14, and the ICMP layer 216 comprises an ICMP manager 228 that is operable to generate out-of-band messages for the mobile unit 14. The managers 224 and 228, as well as other components in the system 10, comprise logic encoded in media. The logic comprises functional instructions for carrying out program tasks. The media comprises computer disks or other computer-readable media, application-specific integrated circuits (ASICs), field-programmable gate arrays (FPGAs), digital signal processors (DSPs), other suitable specific or general purpose processors, transmission media or other suitable media in which logic may be encoded and utilized.

As described below in connection with FIG. 4, the access layer 214 also comprises a service access table 232 that is operable to store data for the service access manager 224 such as session allowability and additional information, and the ICMP layer 216 comprises a vendor-defined service type table 236 that is operable to store data for the ICMP manager 228 such as valid data types 144. The service access table 232 and the service type table 236 each comprise any suitable data store.

The protocol stack 200 also comprises a flow control layer 240 that is operable to provide label-switching functions, along with the service access manager 224, for the mobile unit 14, as described in more detail below in connection with FIGS. 4-6. The flow control layer 240 comprises a flow classifier 244 that is operable to classify a packet for forwarding and a forwarding information base 248 that is operable to store data for use by the flow classifier 244 in processing packets to be forwarded.

The flow classifier 244 is operable to access the forwarding information base 248 in order to obtain information for classifying a packet. For a labeled packet, the flow classifier 244 may access the forwarding information base 248 with the label. For an unlabeled packet, the flow classifier 244 may examine the packet contents and generate a key in order to access the forwarding information base 248. The flow classifier 244 is also operable to apply specified label operations, such as push, pop, swap or other suitable label operation, to a packet and to send the packet to the appropriate forwarding queue.

The flow classifier 244 may be implemented in part by logic stored on a computer-processable medium. The logic may be encoded in hardware and/or software instructions stored in a random access memory, a read only memory, or other suitable computer-processable media.

The forwarding information base 248, which comprises any suitable data store, is used by routing logic to determine how to forward packets for a particular flow. A record for each flow is stored in the forwarding information base 248. The record may comprise the interface to which the packets are to be forwarded, the label operations to be applied to the packets, along with label values, the destination MAC address for storage in the MAC header, the IP address or addresses of the mobile unit 14, the forwarding policy to be applied to packets in the flow, and any other suitable information useful for forwarding the packets. The labels may comprise Layer 2 information that may be used in forwarding packets. The labels available for each flow may comprise a routing label, a traffic characteristic information label, a location information label, or any other suitable label.

Because the mobile unit 14 may execute a plurality of applications 222 simultaneously, the vendor-specific extension 112 of the ASM 100 comprises a data extension 140 for an application identifier to identify the application 222 providing the data and a data extension 140 with the corresponding data from the application 222. In addition, the vendor-specific extension 134 of the AAM 120 comprises a data extension 140 for an application identifier to identify the application 222 to receive the data and a data extension 140 with the corresponding data for the application 222. The service access manager 224 is operable to resolve incoming and outgoing messages based on the application identifier for each application 222.

In operation, when an AAM 120 is received the ICMP manager 228 performs an initial parsing of the vendor-specific extension 134. The ICMP manager 228 compares the data type 144 with the service type table 236. If a match is found, the ICMP manager 228 provides the vendor-specific extension 134 to the service access manager 224. The service access manager 224 identifies the appropriate application 222 based on the application identifier in the vendor-specific extension 134 of the AAM 120 and provides the data to the identified application 222.

In addition, when an application 222 provides data for the foreign agent 70 to the service access manager 224, the service access manager 224 provides the data and the application identifier for the application 222 to the ICMP manager 228. The ICMP manager 228 then generates an ASM 100 including the application identifier and the data in the vendor-specific extension 112.

Figure 4A:
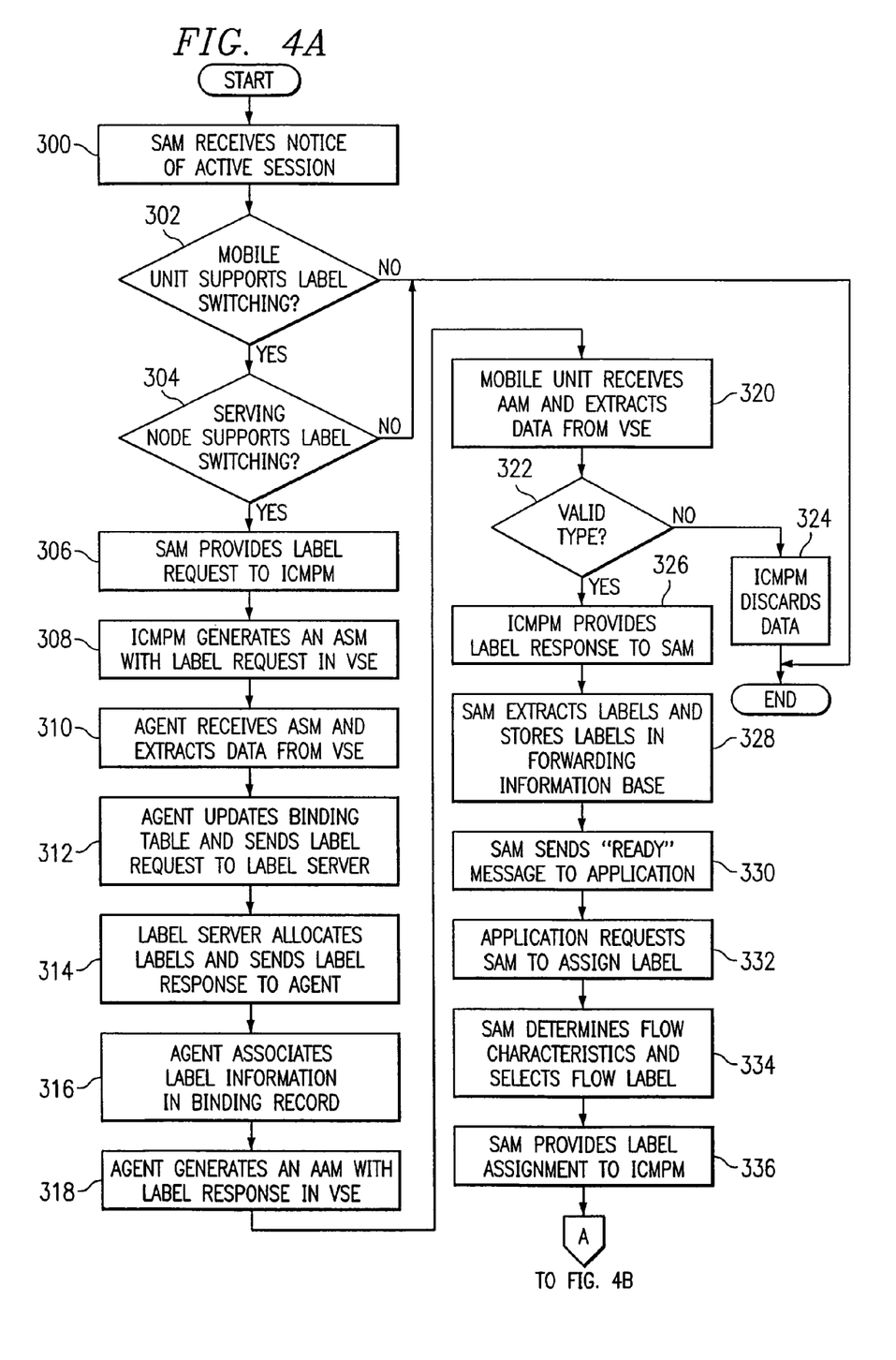
FIG. 4 is a flow diagram illustrating a method for distributed label edge routing in accordance with one embodiment of the present invention.
Figure 4B:
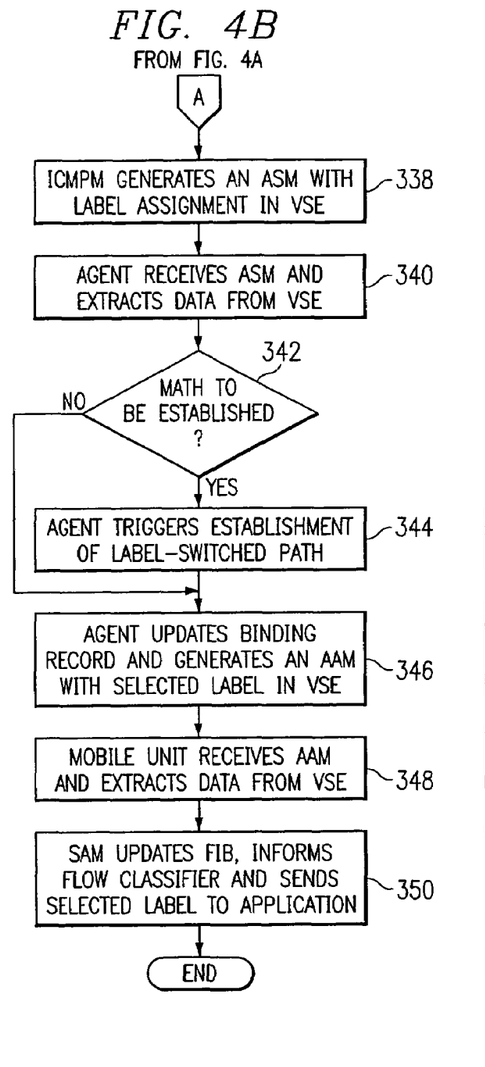

FIG. 4 is a flow diagram illustrating a method for distributed label edge routing in accordance with one embodiment of the present invention. The method begins at step 300 where the service access manager (SAM) 224 receives notice of an active session from a particular application 222 in the mobile unit 14.

At decisional step 302, the SAM 224 makes a determination regarding whether the mobile unit 14 supports label switching and may be run as a label edge router. If the mobile unit 14 does not support label switching, the method follows the No branch from decisional step 302 and comes to an end. However, if the mobile unit 14 supports label switching, the method follows the Yes branch from decisional step 302 to decisional step 304.

At decisional step 304, the SAM 224 makes a determination regarding whether the serving node 24 supports label switching. If the serving node 24 does not support label switching, the method follows the No branch from decisional step 304 and comes to an end. However, if the serving node 24 supports label switching, the method follows the Yes branch from decisional step 304 to step 306.

At step 306, the SAM 224 generates a label request for the application 222 to the ICMP manager (ICMPM) 228. At step 308, the ICMPM 228 generates an ASM 100 with the label request in the vendor-specific extension 112 and transmits the ASM 100 to the foreign agent 70. At step 310, the foreign agent 70 receives the ASM 100 and extracts the data from the vendor-specific extension 112. At step 312, the foreign agent 70 updates the binding record and sends the label request to the label server 18c through the network 22.

At step 314, the label server 18c allocates a set of labels for the mobile unit 14 and sends a label response comprising the allocated labels to the foreign agent 70 through the network 22. At step 316, the foreign agent 70 associates the label information in the binding record based on the label response from the label server 18c. At step 318, the foreign agent 70 generates an AAM 120 with the label response in the vendor-specific extension 134 and transmits the AAM 120 to the mobile unit 14.

At step 320, the mobile unit 14 receives the AAM 120 from the foreign agent 70 and extracts the data from the vendor specific extension 134. At decisional step 322, the ICMPM 228 determines whether the data types 144 for the data extensions 140 in the vendor-specific extension 134 are valid based on a comparison to data types 144 in the service type table 236. If the data types 144 are not valid, the method follows the No branch from decisional step 322 to step 324. At step 324, the ICMPM 228 discards the data from the vendor-specific extension 134, and the method comes to an end. In this situation, the expiration of a timer at the foreign agent 70 may indicate to the foreign agent 70 that the mobile unit 14 has not responded in a timely manner. The foreign agent 70 may then attempt to re-send the AAM 120.

Returning to decisional step 322, if the data types 144 are valid, the method follows the Yes branch from decisional step 322 to step 326. At step 326, the ICMPM 228 provides the label response to the SAM 224. At step 328, the SAM 224 extracts the label information from the label response and stores the labels allocated by the label server 18c in the forwarding information base 248.

At step 330, the SAM 224 sends a "ready" message to the appropriate application 222. At step 332, the application 222 requests a label assignment from the SAM 224. At step 334, the SAM 224 determines flow characteristics for this particular flow for the application 222 and selects a flow label for the application 222 from the forwarding information base 248.

At step 336, the SAM 224 provides the label assignment to the ICMPM 228. At step 338, the ICMPM 228 generates an ASM 100 with the label assignment in the vendor-specific extension 112 and transmits the ASM 100 to the foreign agent 70. At step 340, the foreign agent 70 receives the ASM 100 and extracts the data from the vendor-specific extension 112.

At decisional step 342, the foreign agent 70 makes a determination regarding whether a label-switched path between the serving node 24 and a network edge router should be established. If a label-switched path should be established, the method follows the Yes branch from decisional step 342 to step 344. At step 344, the foreign agent 70 triggers the establishment of the label-switched path between the serving node 24 and the network edge router. The method then continues to step 346. Returning to decisional step 342, if a label-switched path does not need to be established, the method follows the No branch from decisional step 342 to step 346.

At step 346, the foreign agent 70 updates the binding table 72 and generates an AAM 120 with the selected label in the vendor-specific extension 134. At step 348, the mobile unit 14 receives the AAM 120 and extracts the data from the vendor-specific extension 134. At step 350, the SAM 224 updates the forwarding information base 248, informs the flow classifier 244 of the selected label, and sends the selected label to the appropriate application 222, at which point the method comes to an end. At this point, the application 222 may send and receive label-switched traffic to and from the network 22 through the serving node 24. Also, another application 222 may then request and be provided with a label assignment beginning with step 332.

Figure 5:
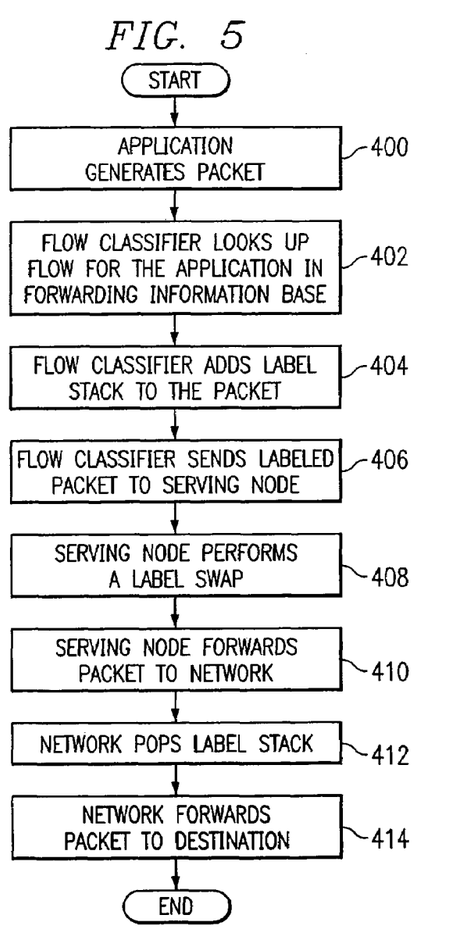
FIG. 5 is a flow diagram illustrating a method for providing label-switched traffic from the mobile unit of FIG. 1 to the network of FIG. 1 in accordance with one embodiment of the present invention.

FIG. 5 is a flow diagram illustrating a method for providing label-switched traffic from the mobile unit 14 to the network 22 in accordance with one embodiment of the present invention. The method begins at step 400 where an application 222 in the mobile unit 44 generates a packet for delivery by the network 22 to a particular destination. At step 402, the flow classifier 244 looks up the flow for the application 222 in the forwarding information base 248. At step 404, the flow classifier 244 adds, or pushes, a label stack to the packet based on the data in the forwarding information base 248. At step 406, the flow classifier 244 sends the labeled packet to the serving node 24.

At step 408, the serving node 24 performs a label swap on the labeled packet based on data retrieved from a forwarding information base in the serving node 24. This results in the replacement of a mobile-side label with a network-side label. The serving node 24 may also apply Quality of Service (QoS) processing at this point. At step 410, the serving node 24 forwards the packet to the network 22. At step 412, the network 22 removes, or pops, the label stack based on data retrieved from a forwarding information base in the network 22. At step 414, the network 22 forwards the packet to the appropriate destination, at which point the method comes to an end.

Figure 6:
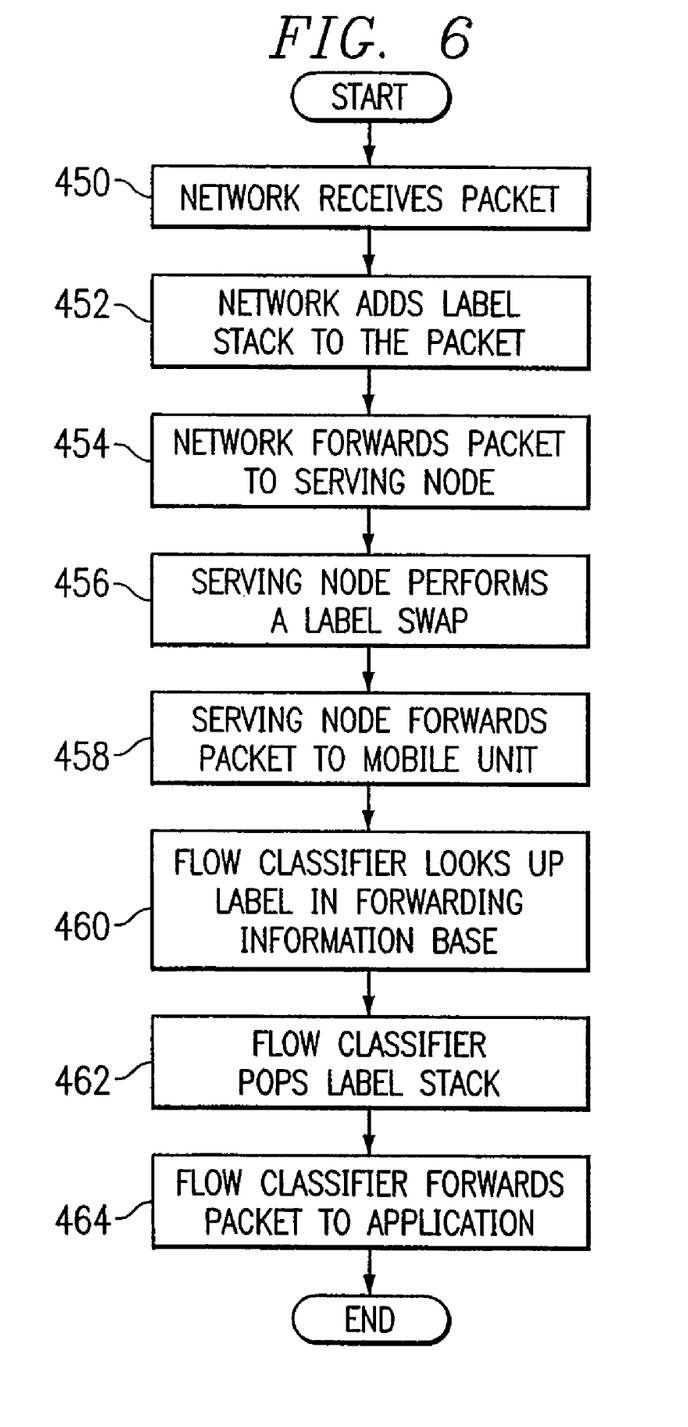
FIG. 6 is a flow diagram illustrating a method for providing label-switched traffic from the network of FIG. 1 to the mobile unit of FIG. 1 in accordance with one embodiment of the present invention.

FIG. 6 is a flow diagram illustrating a method for providing label-switched traffic from the network 22 to the mobile unit 14 in accordance with one embodiment of the present invention. The method begins at step 450 where the network 22 receives a packet destined for a particular application 222 in the mobile unit 14. At step 452, the network 22 adds, or pushes, a label stack to the packet based on data retrieved from a forwarding information base in the network 22. At step 454, the network 22 forwards the packet to the serving node 24.

At step 456, the serving node 24 performs a label swap based on data retrieved from a forwarding information base in the serving node 24. This results in the replacement of a network-side label with a mobile-side label. The serving node 24 may also apply QoS processing at this point. At step 458, the serving node 24 forwards the packet to the mobile unit 14. At step 460, the flow classifier 244 looks up the label for the packet in the forwarding information base 248. At step 462, the flow classifier 244 removes, or pops, the label stack based on the data from the forwarding information base 248. At step 464, the flow classifier 244 forwards the packet to the appropriate application 222, at which point the method comes to an end.

In this way, the mobile unit 14 may differentiate between individual flows from different applications 222 that terminate at or beyond the mobile unit 14. The mobile unit 14 can, therefore, assign labels that may be used by the mobile unit 14, the serving node 24 and the network 22 to provide differentiated QoS levels to each individual flow.

In addition, because each mobile unit 14 provides flow classification and labeling, the processing load is distributed among the mobile units 14. This relieves much of the burden on the resources of the serving node 24 and results in an increased capacity such that the serving node 24 may support a greater number of sessions.

Furthermore, the mobile unit 14 may assign and/or modify the characteristics of individual flows in real-time, as opposed to relying on a network service provider to perform this task. Thus, in accordance with the service level agreement for the mobile unit 14, the mobile unit 14 may modify flow characteristics such as traffic type, data rate type, throughput, latency, burst size, error rate, and any other suitable characteristics for each flow for the mobile unit 14. The mobile unit 14 may also use this capability in order to establish service level agreements with users 54.

Although the present invention has been described with several embodiments, various changes and modifications may be suggested to one skilled in the art. It is intended that the present invention encompasses such changes and modifications as fall within the scope of the appended claims.

What is claimed is:

1. A method comprising:
establishing a data session between a mobile unit and a serving node, wherein a forwarding information base included in the mobile unit is populated with a label stack associated with the data session;
determining, at the mobile unit, whether the serving node comprises a foreign agent;
upon determining the serving node comprises a foreign agent, transmitting information, indicative to a home agent, of an identity of the mobile unit;
receiving, at the mobile unit, an agent advertisement with label information;
correlating the label information to the data session; and
populating available information in a vendor extension field that is included as part of an agent solicitation message that is sent to the serving node by the mobile unit, whereby the information in the vendor extension field is processed out-of-band with respect to a payload of the agent solicitation message.

2. The method of claim 1, further comprising:
communicating one or more traffic characteristics associated with the end user to the serving node along with the label stack.

3. The method of claim 1, wherein the mobile unit:
allocates a session specific label in response to session activity associated with an end user of the mobile unit;
communicates a new label stack to the serving node to allow the serving node to perform routing at a layer two level;
classifies the data session;
stores one or more flow labels for a plurality of applications of the mobile unit;
classifies one or more flows using one or more flow characteristics; and
provisions one or more of the flow labels for one or more of the flows based on one or more of the flow characteristics.

4. The method of claim 1, further comprising:
removing, at the mobile unit, an inbound label stack from each of a plurality of inbound packets; and
forwarding the plurality of inbound packets to an application included in the mobile unit.

5. The method of claim 1, further comprising:
generating, at the mobile unit, a label request for an application;
receiving at, the mobile unit, a label response based on the label request, the label response comprising at least one label;
determining, at the mobile unit, flow characteristics and a flow label for a flow, the flow label comprising one of the labels in the label response; and
storing, at the mobile unit, the flow characteristics and the flow label for the flow.

6. The method of claim 5, wherein the label response is based on a label allocation performed at a label server, the label server coupled to the network.

7. The method of claim 5, further comprising:
generating a label request comprising generating an agent solicitation message, the agent solicitation message comprising a vendor-specific extension, the vendor-specific extension comprising the label request.

8. The method of claim 5, further comprising:
receiving the agent advertisement message, the agent advertisement message comprising a vendor-specific extension, the vendor-specific extension comprising the label response.

9. The method of claim 5, further comprising:
   determining, at the mobile unit, whether the mobile unit supports label switching; and
   determining, at the mobile unit, whether the serving node supports label switching.

10. The method of claim 1, wherein the mobile unit stores a list of class of services such that when traffic from a user is received at the mobile unit, the mobile unit classifies the traffic with the labels from the forwarding information base and sends the traffic to the serving node.

11. The method of claim 1, wherein the serving node evaluates a selected one of the label stacks and performs routing at a layer-2 level.

12. The method of claim 1, wherein the mobile unit operates as a policy decision point in controlling one or more policy endpoints.

13. The method of claim 1, further comprising providing the serving node with an indication of whether the mobile unit supports out-of-band communication.

14. A method comprising:
   establishing a data session between a mobile unit and a serving node, wherein a forwarding information base included in the mobile unit is populated with a label stack associated with the data session;
   determining, at the mobile unit, whether the serving node comprises a foreign agent;
   upon determining the serving node comprises a foreign agent, transmitting information, indicative to a home agent, of an identity of the mobile unit;
   receiving, at the mobile unit, an agent advertisement with label information;
   correlating the label information to the data session, wherein the serving node evaluates a selected one of the label stacks and performs routing at a layer-2 level, and wherein the mobile unit operates as a policy decision point in controlling one or more policy endpoints such that the mobile unit is able to specify differentiated services to individual flows that are aggregated at the mobile unit; and
   populating available information in a vendor extension field that is included as part of an agent solicitation message that is sent to the serving node by the mobile unit, whereby the information in the vendor extension field is processed out-of-band with respect to a payload of the agent solicitation message.

15. The method of claim 14, further comprising:
   communicating one or more traffic characteristics associated with the end user to the serving node along with the label stack.

16. The method of claim 14, wherein the mobile unit:
   allocates a session specific label in response to session activity associated with an end user of the mobile unit;
   communicates a new label stack to the serving node such that the serving node can perform routing at a layer two level;
   classifies the data session;
   stores one or more flow labels for a plurality of applications of the mobile unit;
   classifies one or more flows using one or more flow characteristics; and
   provisions one or more of the flow labels for one or more of the flows based on one or more of the flow characteristics.

17. The method of claim 14, further comprising:
   removing, at the mobile unit, an inbound label stack from each of a plurality of inbound packets; and
   forwarding the plurality of inbound packets to an application included in the mobile unit.

18. The method of claim 14, further comprising:
   generating, at the mobile unit, a label request for an application;
   receiving at, the mobile unit, a label response based on the label request, the label response comprising at least one label;
   determining, at the mobile unit, flow characteristics and a flow label for a flow, the flow label comprising one of the labels in the label response; and
   storing, at the mobile unit, the flow characteristics and the flow label for the flow.

19. The method of claim 18, wherein the label response is based on a label allocation performed at a label server, the label server coupled to the network.

20. The method of claim 18, further comprising:
   generating a label request comprising generating an agent solicitation message, the agent solicitation message comprising a vendor-specific extension, the vendor-specific extension comprising the label request.

21. The method of claim 18, further comprising:
   receiving the agent advertisement message, the agent advertisement message comprising a vendor-specific extension, the vendor-specific extension comprising the label response.

22. The method of claim 18, further comprising:
   determining, at the mobile unit, whether the mobile unit supports label switching; and
   determining, at the mobile unit, whether the serving node supports label switching.

23. The method of claim 14, wherein the mobile unit stores a list of class of services such that when traffic from a user is received at the mobile unit, the mobile unit classifies the traffic with the labels from the forwarding information base and sends the traffic to the serving node.

24. The method of claim 14, further comprising providing the serving node with an indication of whether the mobile unit supports out-of-band communication.

* * * * *

UNITED STATES PATENT AND TRADEMARK OFFICE
CERTIFICATE OF CORRECTION

PATENT NO.        : 7,623,505 B1                                                                Page 1 of 1
APPLICATION NO. : 11/271254
DATED             : November 24, 2009
INVENTOR(S)       : Holur et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 678 days.

Signed and Sealed this

Twenty-sixth Day of October, 2010

David J. Kappos
*Director of the United States Patent and Trademark Office*